United States Patent
Inohiza

(10) Patent No.: US 11,496,962 B2
(45) Date of Patent: Nov. 8, 2022

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Hirohiko Inohiza, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 173 days.

(21) Appl. No.: 16/834,378

(22) Filed: Mar. 30, 2020

(65) Prior Publication Data

US 2020/0336981 A1 Oct. 22, 2020

(30) Foreign Application Priority Data

Apr. 22, 2019 (JP) .................. 2019-081314

(51) Int. Cl.
H04W 52/02 (2009.01)
H04W 84/12 (2009.01)

(52) U.S. Cl.
CPC ... *H04W 52/0219* (2013.01); *H04W 52/0222* (2013.01); *H04W 52/0235* (2013.01); *H04W 84/12* (2013.01)

(58) Field of Classification Search
CPC ......... H04W 52/0219; H04W 52/0222; H04W 52/0235; H04W 84/12

USPC ........................................................ 370/311
See application file for complete search history.

(56) References Cited

U.S. PATENT DOCUMENTS

| 8,811,320 B2 | 8/2014 | Inohiza | |
|---|---|---|---|
| 10,263,834 B2 | 4/2019 | Inohiza | |
| 2019/0028967 A1* | 1/2019 | Ahn | H04B 7/02 |
| 2021/0153121 A1* | 5/2021 | Huang | H04W 52/0225 |

FOREIGN PATENT DOCUMENTS

JP 2018113646 A 7/2018

* cited by examiner

*Primary Examiner* — Gbemileke J Onamuti
(74) *Attorney, Agent, or Firm* — Carter, DeLuca & Farrell LLP

(57) ABSTRACT

A communication apparatus operable to communicate with a plurality of terminal stations capable of operating in a Doze state and in an Awake state in an IEEE 802.11ba standard, obtains, from each of the plurality of terminal stations, a value of a Transition delay indicating a time period required to switch from the Doze state to the Awake state, groups the plurality of terminal stations into a plurality of groups based on the value of each of the plurality of terminal stations, sets an order for transmitting the Wake-up frame for causing a transition from the Doze state to the Awake state for each of the plurality of groups, and transmits, according to the set order, the Wake-up frame to one or more terminal stations belonging to each of the plurality of groups.

13 Claims, 10 Drawing Sheets

FIG. 6

| AID | Transition delay | Group |
|---|---|---|
| 1 | 256μs | 2 |
| 2 | 256μs | 2 |
| 3 | 512μs | 1 |
| 4 | 1024μs | 1 |

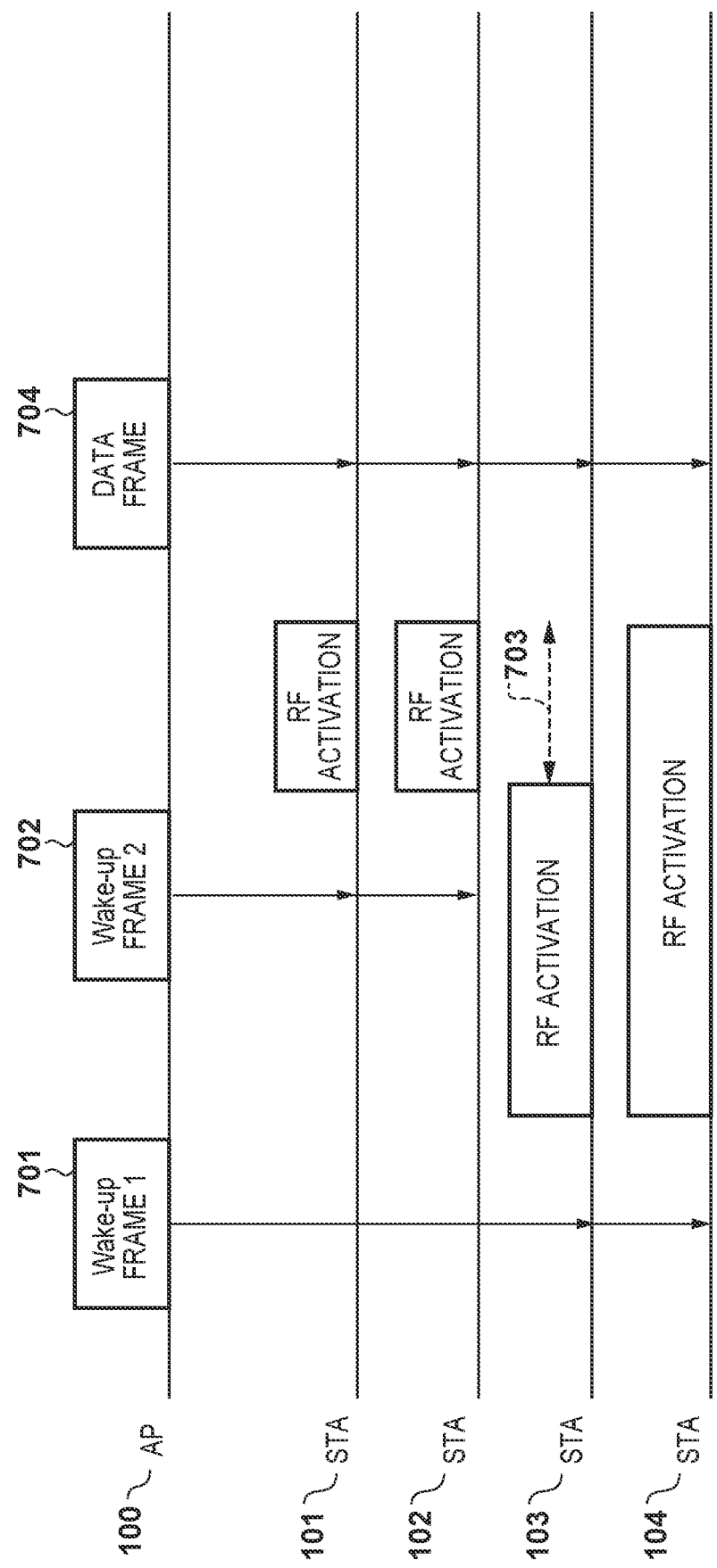

FIG. 9

| AID | Transition delay | Group |
|---|---|---|
| 1 | 256μs | 2 |
| 2 | 256μs | 2 |
| 3 | 2048μs | 1 |
| 4 | 2048μs | 1 |

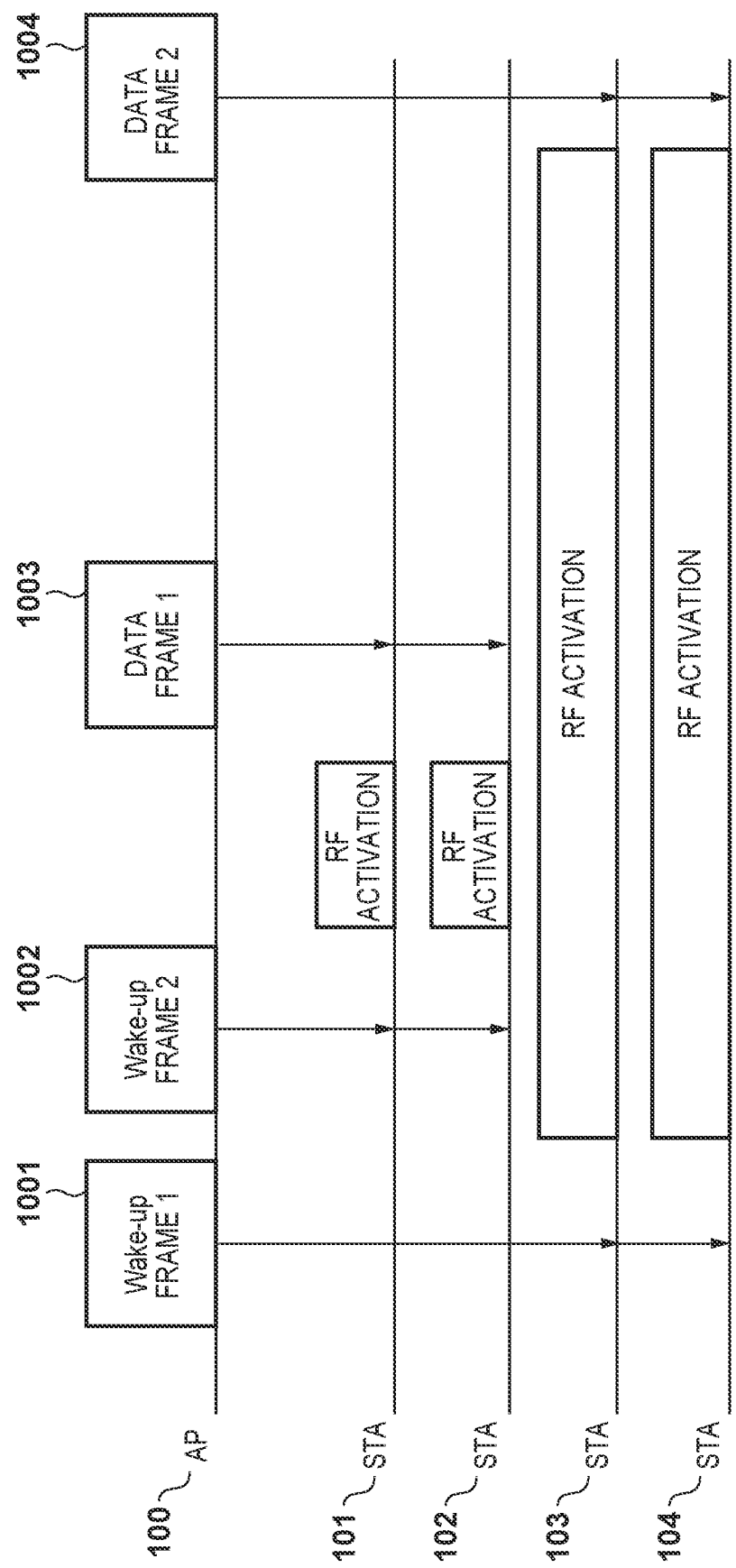

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a communication control technique in a wireless LAN.

Description of the Related Art

Devices on which a wireless communication function is mounted have diversified, and in particular, there is demand for realization of wireless communication with power saving in battery-driven IoT (Internet Of Things) devices and embedded equipment. In relation to this, in a wireless LAN, when the wireless communication function does not perform communication, specifications for transitioning to a power saving (Power Save) mode have been established by in IEEE (Institute of Electrical and Electronics Engineers) 802.11. In order to further improve power saving performance, an IEEE 802.11ba standard is being considered at the IEEE. In the IEEE 802.11ba standard, a WUR (Wake-up Radio) unit is provided separately from a conventional RF (Radio Frequency) circuit in order to improve power saving. The WUR unit can operate with low power consumption, and enables further improvements to power saving performance by a transition to a Doze state when a conventional RF unit is not performing communication.

Japanese Patent Laid-Open No. 2018-113646 proposes a method of, when an AP (access point) holds data addressed to an STA (station) that is a wireless LAN terminal station in the Doze state, transmitting a Wake-up frame addressed to the STA, and, after the STA transitions to an Awake state, transmitting the data addressed to the STA.

In an IEEE 802.11ba standard, the time period required when switching from the Doze state to the Awake state is different for each STA, and each STA notifies the AP of information on the time period for the switching (Transition delay) when the STA joins the network. When transmitting a data frame addressed to a plurality of STAs, the AP stores the longest Transition delay value among the plurality of STAs in a Wake-up frame and transmits it to the STAs. After waiting the time period for the longest Transition delay, the AP transmits a data frame addressed to the plurality of STAs. Each STA waits the time period for Transition delay stored in the received Wake-up frame, and then receives the data frame. In this manner, transmission of a data frame before the STAs finish activating the conventional RF units in the AP is prevented.

However, in the above-described process, an STA having a shorter time period for switching from the Doze state to the Awake state needs to continue to wait in the Awake state because of STAs having a longer switching time period, and thus power consumption increases.

SUMMARY OF THE INVENTION

In view of the above problems, the present disclosure provides a technique for reducing power consumed by an STA whose time period for switching from the Doze state to the Awake state is short.

According to one aspect of the present invention, there is provided a communication apparatus operable to communicate with a plurality of terminal stations capable of operating in a Doze state in which it is not able to transmit or receive a frame other than a WUR (Wake-up Radio) frame in an IEEE 802.11ba standard and in an Awake state in the standard, the communication apparatus comprises: an obtainment unit configured to obtain, from each of the plurality of terminal stations, a value of a Transition delay indicating a time period required to switch from the Doze state to the Awake state; a grouping unit configured to group the plurality of terminal stations into a plurality of groups based on the value of each of the plurality of terminal stations; a setting unit configured to set an order for transmitting the Wake-up frame for causing a transition from the Doze state to the Awake state for each of the plurality of groups; and a transmitting unit configured to transmit, according to the set order, the Wake-up frame to one or more terminal stations belonging to each of the plurality of groups.

Further features of the present invention will become apparent from the following description of exemplary embodiments (with reference to the attached drawings).

BRIEF DESCRIPTION OF THE DRAWINGS

FIG. 6 is a table showing an example of a result of grouping in the first embodiment.

FIG. 7 shows an example of a sequence for a Wake-up process in the first embodiment.

FIG. 9 is a table showing an example of a result of grouping in the second embodiment.

FIG. 10 shows a second example of a sequence for a Wake-up process in the second embodiment.

DESCRIPTION OF THE EMBODIMENTS

Figure 1:
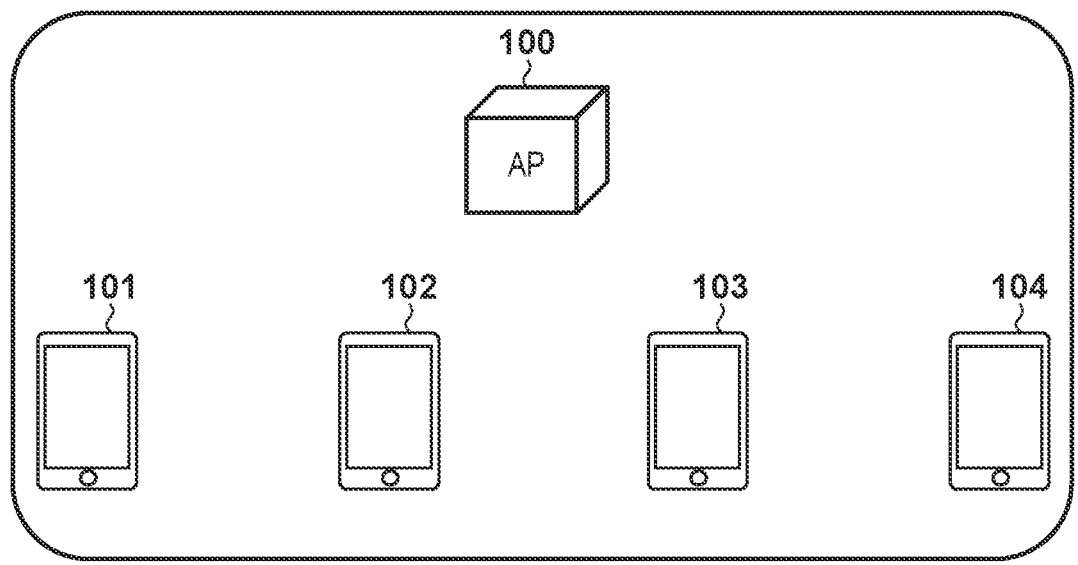
FIG. 1 shows an example of a network configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment (Network Configuration)

FIG. 1 shows a configuration example of a wireless communication network 10 according to the first embodiment. The wireless communication network 10 is configured by STAs 101 to 104 and an AP 100 which conform to an IEEE 802.11ba standard, where the STAs 101 to 104 are connected to the AP 100. The STAs 101 to 104 operate in a Doze state when there is no need to transmit or receive a data frame, and, upon receipt of a Wake-up frame from the AP 100, switch to an Awake state and receives a data frame from the AP 100. When the AP 100 holds data addressed to the STAs 101 to 104, it transmits a Wake-up frame to the STAs, has the STAs 101 to 104 enter the Awake state, and then transmits the data addressed to the STAs 101 to 104. Examples of data addressed to the STAs 101 to 104 include application data for broadcast such as group chat, a sensor information obtainment command, updated BSS (Basic Service Set) parameters, etc. BSS parameter includes, for example, a Channel Switch announce element, Extended Channel Switch announce element, Wide Bandwidth Channel Switch element, Operating Mode Notification element, EDCA parameter, HT Operation element, VHT Operation element, DHSS Parameter Set, and the like that are included in a Beacon frame. It should be noted that the network configuration of FIG. 1 is an example, and the following discussion can be applied as long as the number of the STAs connected to the AP 100 is plural.

(Configuration of Communication Apparatus)

Figure 2:
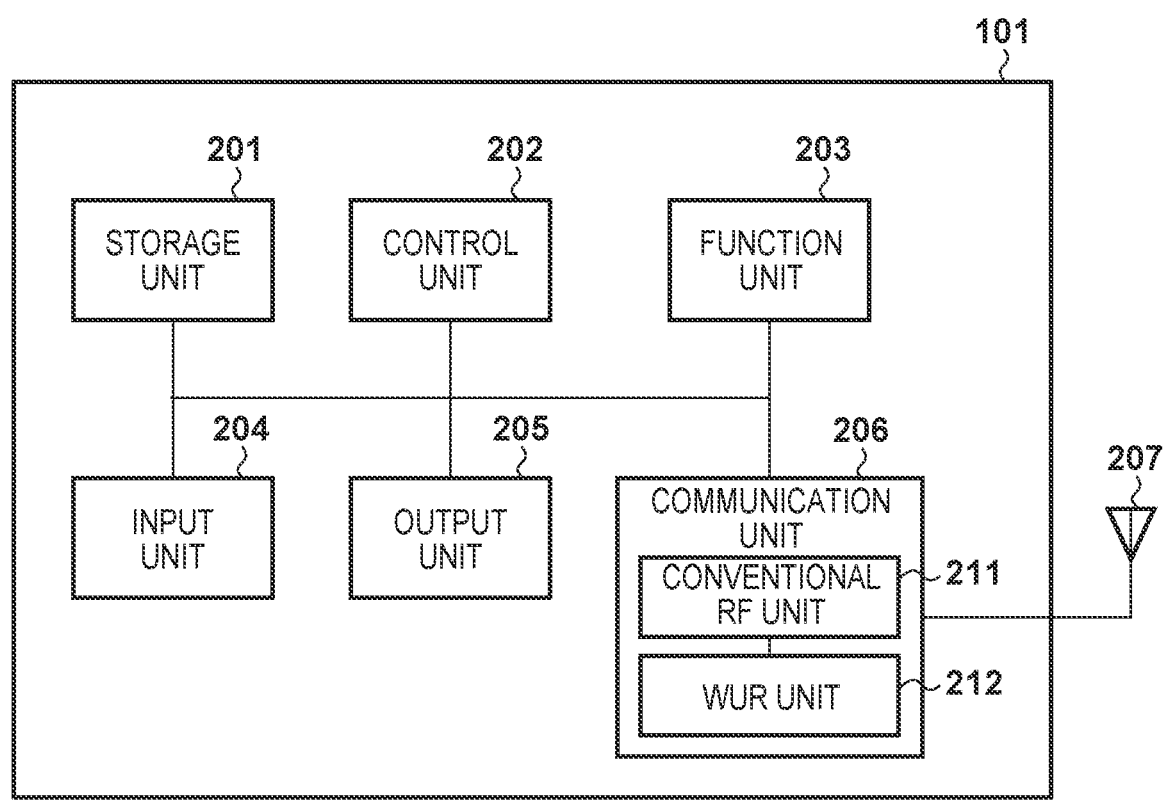
FIG. 2 shows an example of a hardware configuration of an AP.

FIG. 2 shows an example of a hardware configuration of the AP 100. The AP 100, as an example of its hardware configuration, includes a storage unit 201, a control unit 202, a function unit 203, an input unit 204, an output unit 205, a communication unit 206, and an antenna 207.

The storage unit 201 is configured by a memory such as a ROM or a RAM, and stores a program for performing various operations to be described later, and various information such as communication parameters for wireless communication. As the storage unit 201, a storage medium such as a floppy disk, a hard disk, an optical disk, a magneto-optical disk, a CD-ROM, CD-R, a magnetic tape, a nonvolatile memory card, a DVD, or the like may be used in addition to a memory such as a ROM or a RAM. The storage unit 201 may include a plurality of memories or the like.

The control unit 202 is configured by one or more processors such as CPUs, MPUs, and the like, and controls the AP 100 by executing programs stored in the storage unit 201. The control unit 202 may control the AP 100 in accordance with cooperation between programs stored in the storage unit 201 and an OS (Operating System). In addition, the control unit 202 may include a plurality of processors such as multi-cores to control the AP 100. The control unit 202 controls the function unit 203 to execute predetermined processing such as image capturing, printing, and projection. The function unit 203 is hardware for the AP 100 to execute a predetermined process.

The input unit 204 accepts various operations from the user. The output unit 205 performs various outputs with respect to the user. Here, the output by the output unit 205 includes at least one of displaying on a screen, sound output by a speaker, vibration output, and the like. It should be noted that both the input unit 204 and the output unit 205 may be realized by one module as in a touch panel.

The communication unit 206 controls a conventional RF (Radio Frequency) unit (circuit) 211, a WUR (Wake-up Radio) unit 212, and the antenna 207 to transmit and receive wireless signals for wireless communication. The conventional RF unit 211 controls wireless communication compliant with a standard of the IEEE 802.11 series or Wi-Fi, and controls Internet Protocol (IP) communication. Generally, since the AP 100 performs transmission processing in only the WUR unit 212, the communication unit 206 is only able to operate the transmission function of the WUR unit 212. For the antenna 207, although only one is shown in FIG. 2, configuration may be taken to have two or more antennas in order to perform MIMO (Multiple-Input Multiple-Output) communication.

The hardware configuration of each of the STA 101 to 104 is similar to FIG. 2, and as an example includes a storage unit 201, a control unit 202, a function unit 203, an input unit 204, an output unit 205, a communication unit 206, and an antenna 207. However, because the STAs 101 to 104 typically perform only processing for receiving by the WUR unit 212, the communication unit 206 is able to cause only the receiving function of the WUR unit 212 to operate. Specifically, taking the STA 101 as an example, the WUR unit 212 receives a Beacon frame or a Wake-up frame for WUR in an interval when the STA 101 is in the Doze state. Further, the WUR unit 212, upon receiving the Wake-up frame, causes the Doze state to end, and causes the function of the transmission and reception of the conventional RF unit to activate via the communication unit 206 (or the control unit 202) (the STA 101 enters the Awake state). During the interval of the Doze state, since the conventional RF unit 211 stops its transmission/reception function to save power, the WUR unit 212 exclusively handles the function of the communication unit 206.

Figure 3:
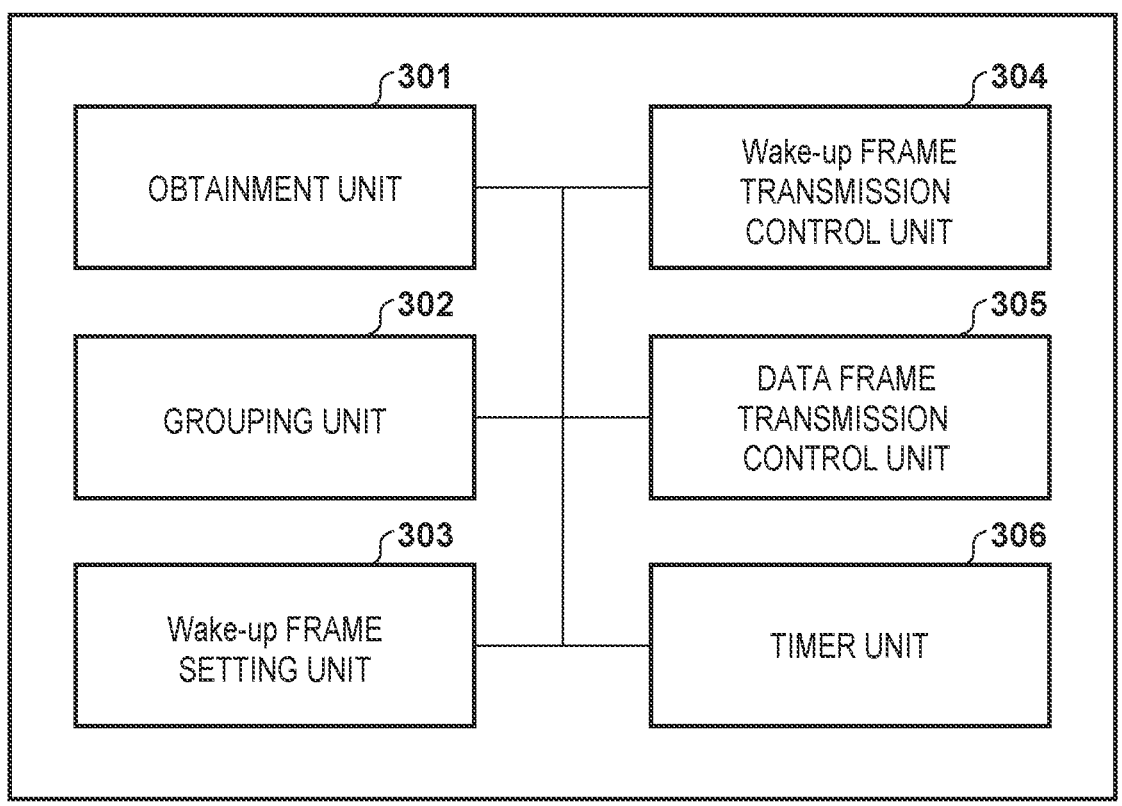
FIG. 3 shows an example of a functional configuration of the AP.

FIG. 3 shows an example of a functional configuration of the AP 100. The AP 100 includes, as an example of its functional configuration, an obtainment unit 301, a grouping unit 302, a Wake-up frame setting unit 303, a Wake-up frame transmission control unit 304, a data frame transmission control unit 305, and a timer unit 306.

The obtainment unit 301 obtains predetermined information included in a signal received via the communication unit 206 (FIG. 2). For example, the obtainment unit 301 obtains a Transition delay. Transition delay represents the time period required for the STAs to switch from Doze state to Awake state, that is, the time period for each of the STAs 101 to 104 to complete the activation of the conventional RF unit 211 in response to the reception of a Wake-up frame. The Transition delay can take on values that differ between the STAs 101 to 104. The Transition delay is included in an Association frame or the like transmitted when the STAs 101 to 104 join the network configured by the AP 100. The obtainment unit 301 obtains the AIDs (Association ID (Identifier)) of the STAs 101 to 104. An AID is identification information assigned by the AP 100 to identify the STA when the STAs 101 to 104 joins networks.

The grouping unit 302 groups the STAs 101 to 104 based on Transition delay values obtained from the STAs 101 to 104. The Wake-up frame setting unit 303 performs settings regarding a Wake-up frame. The Wake-up frame setting unit 303 sets, for example, to which the STAs the Wake-up frame is to be transmitted, and in which order Wake-up frames are transmitted. The Wake-up frame transmission control unit 304 controls the transmission of Wake-up frames via the WUR unit 212 of the communication unit 206. The data frame transmission control unit 305 controls transmission of a data frame via the conventional RF unit 211 of the communication unit 206. The data frame transmission control unit 305 can also control the order of transmission of data frames. The timer unit 306 performs a time measurement process.

(Processing Flow)

Figure 4:
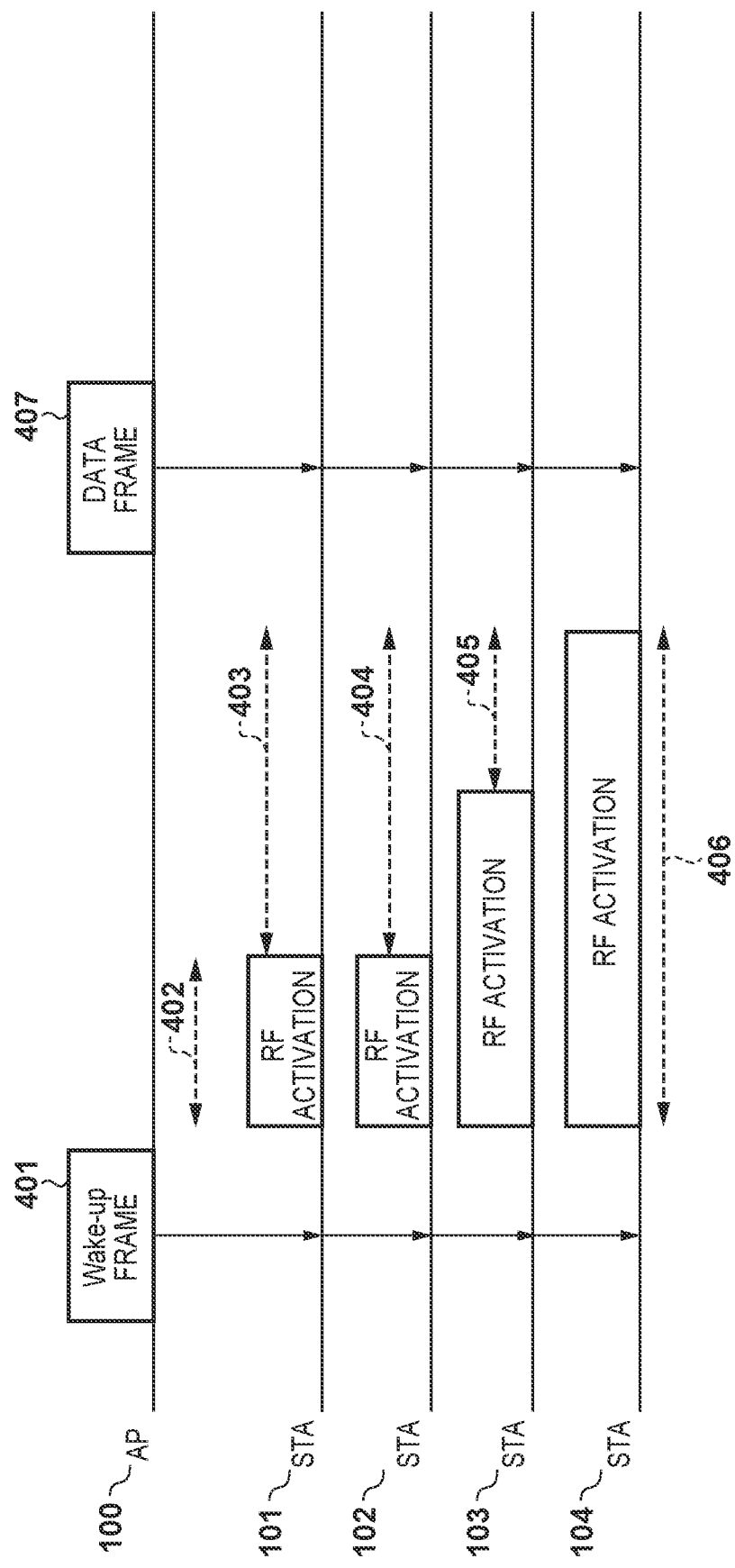
FIG. 4 shows a sequence for a conventional Wake-up process.

Next, a process executed by the AP 100 according to the present embodiment will be described. First, a conventional Wake-up process will be described. FIG. 4 shows a sequence for a conventional Wake-up process. It is assumed that AP 100 and the STAs 101 to 104 are connected as shown in FIG. 1.

When each of the STAs 101 to 104 receive a Wake-up frame 401 transmitted by AP 100, each STA activates their conventional RF unit 211. As described above, the time periods (Transition delay) to switch from the Doze state to the Awake state for the STAs 101 to 104 differ. For example, time period 402 represents the Transition delay of the STA 101 and time period 405 represents the Transition delay of the STA 104. The AP 100 stores the value of a longest Transition delay in a Wake-up frame that is to be transmitted. Since Transition delay of the STA 104 (time period 406) is the longest in the example of FIG. 4, its value is stored in the Wake-up frame. The STAs 101, 102 and 103, wait respective intervals for the time periods 403, 404 and 405, respectively, until the activation of the STA 104 conventional RF unit 211 is completed, according to the value of Transition delay stored in the Wake-up frame, although the STAs 101, 102, and 103 have shorter time periods to switch to the Awake state than the STA 104. AP 100 transmits a data frame 407 after the timing at which all of the STAs 101 to 104 switch to the Awake state (the timing at which the time period 406 ends). As described above, in the conventional technique, STAs (the STAs 101 to 103) having a shorter time period to switch to the Awake state needs to continue to wait in the Awake state because of the STA (the STA 104) having a longer time period for switching, and power consumption will increase.

Figure 5:
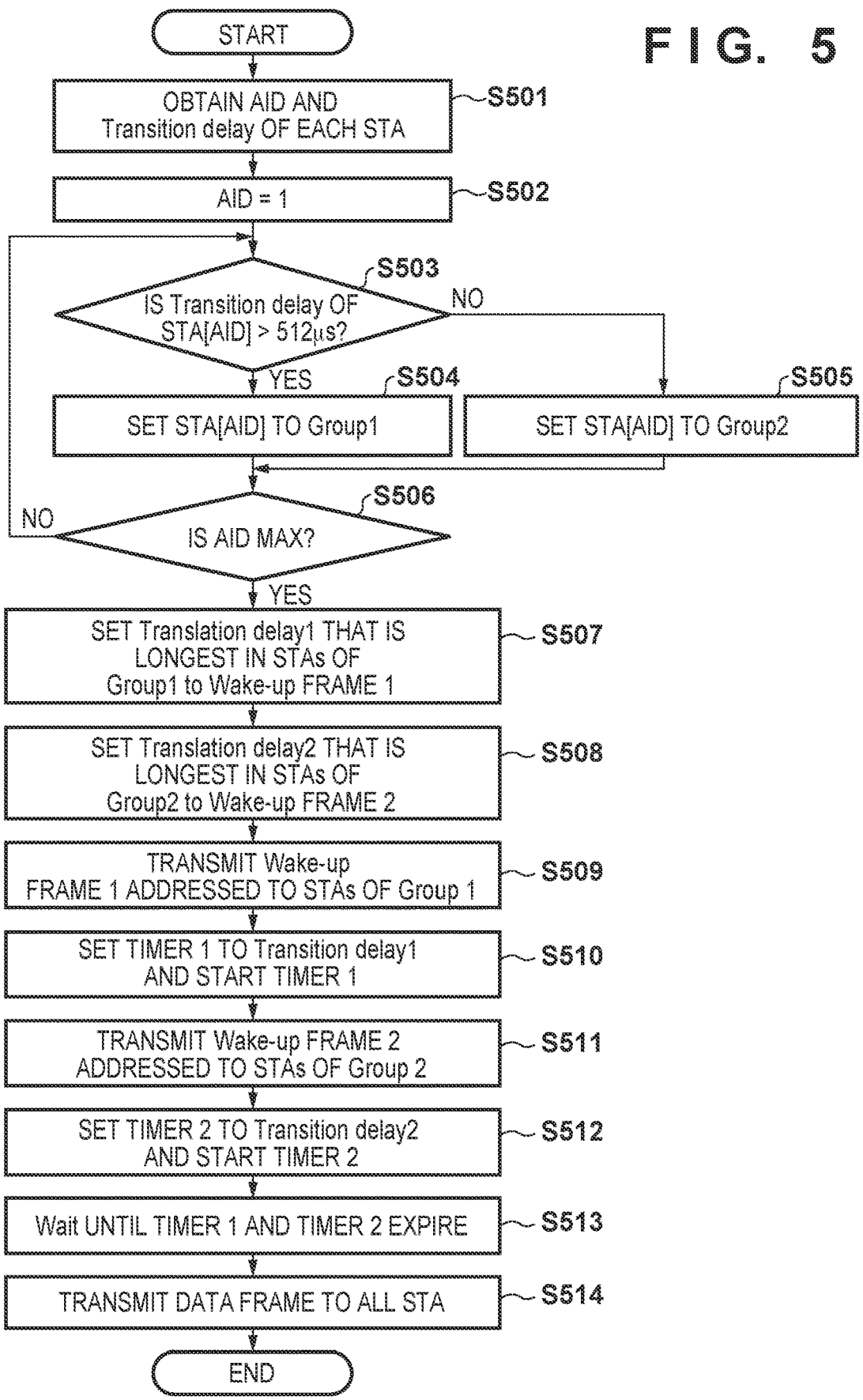
FIG. 5 is a flowchart of processing executed by an AP in a first embodiment.

In contrast to such a conventional example, in the present embodiment, the AP 100 operates as follows. FIG. 5 shows a flowchart for processing executed by the AP 100 in the present embodiment. The flowchart shown in FIG. 5 can be realized by the control unit 202 of the AP 100 executing a control program stored in the storage unit 201, executing calculation and processing of information, and executing control of respective hardware. The process shown in FIG. 5 can start when the AP 100 holds data addressed to the STAs 101 to 104.

In step S501, the obtainment unit 301 obtains the AIDs and Transition delay of the STAs 101 to 104. The obtainment unit 301 can obtain Transition delay from a WUR Capability Element included in a received Association frame or the like. For purposes of description, AIDs are 1 to 4 for the STA 101 to the STA 104, respectively.

Next, in step S502, the grouping unit 302 sets AID=1. In step S503, the grouping unit 302 obtains the Transition delay of the STA corresponding to AID=1 (STA[1]) (in other words, the STA 101), and determines whether or not the value of Transition delay is larger than a first predetermined value (512 µs in the case of FIG. 5). If the value of the Transition delay of the STA[1] is greater than the first predetermined value (YES in step S503), the process proceeds to step S504, otherwise (NO in step S503), the process proceeds to step S505.

In step S504, the grouping unit 302 assigns the STA[1] to Group1, and in step S505, the grouping unit 302 assigns the STA[1] to Group2. In step S506, the grouping unit 302 determines whether the AID has reached the largest value (4 in the present example) for all the STAs, and if the AID has not reached the largest value (NO in step S506), the process returns to step S503 to continue the grouping of the remaining the STAs. If the largest value has been reached (YES in step S506), the grouping unit 302 completes the grouping and the process proceeds to step S507.

FIG. 6 is a table showing an example of results of grouping in accordance with the processing of step S504 and step S505 for the STA[1] to the STA[4] (i.e., the STAs 101 to 104). According to processing for step S504 and step S505, the STA[1] and the STA[2] (i.e., the STA 101 and the STA 102) which both have Transition delay values of 256 µs are classified as Group2. Also, the STA[3] and the STA[4] (i.e., the STA 103 and the STA 104) which have Transition delay values of 512 µs and 1024 µs, respectively, are classified as Group1. Although the number of groups is described as being two in FIGS. 5 and 6, the number of groups is not limited to two and may be three or more. That is, regardless of the number of groups, in the processing of up to step S506, the grouping unit 302 groups a plurality of STAs into a plurality of groups so that one or more STAs having Transition delay values within a predetermined range are in the same group.

In step S507, the Wake-up frame setting unit 303 selects the longest value of the Transition delay of the STA[3] and the STA[4] belonging to Group1, and sets this longest value as a Transition delay (Transition delay 1) of a Wake-up frame for (Wake-up frame 1) for Group1. In the case of the example of FIG. 6, since the Transition delays of the STAs of Group1 are 512 us and 1024 us, the Wake-up frame setting unit 303 sets 1024 us to Transition delay 1. Next, in step S508, the Wake-up frame setting unit 303 sets the Transition delay (Transition delay 2) of a Wake-up frame (Wake-up frame 2) for Group 2. In the case of the example of FIG. 6, since the Transition delays of the STAs of Group2 are both 256 us, the Wake-up frame setting unit 303 sets 256 us to Transition delay 2.

Next, in step S509, the Wake-up frame transmission control unit 304 transmits Wake-up frame 1 addressed to the STAs of Group 1, and in step S510, the timer unit 306 starts a timer (timer 1) for waiting for the time period of Transition delay 1. The timer may be started immediately after Wake-up frame 1 is transmitted, and the timer may be started after a predetermined time that considers the transmission delay (propagation delay) has elapsed. Hereinafter, it is similar for the start timing of a timer. Next, in step S511, the Wake-up frame transmission control unit 304 transmits Wake-up frame 2 addressed to the STAs of Group 2, and in step S512, the timer unit 306 starts a timer (timer 2) for waiting for the time period of Transition delay 2. In step S513, the data frame transmission control unit 305 waits until the two timers of the timers 1 and 2 expire, and transmits the data frame addressed to all the STAs in step S514 after their expiration (after the passage of Transition delay 1 and Transition delay 2).

FIG. 7 shows sequences of Wake-up processing according to the present embodiment in accordance with the results of the processing shown in FIG. 5 and the grouping shown in FIG. 6. The AP 100 transmits the first Wake-up frame 701 to the STA 104 in the STA 103 where the time period for switching to the Awake state is longer based on the results of grouping the STAs 101 to 104. In response, the STA 103 and the STA 104 start processing for activating their conventional RF unit. Next, the AP 100 transmits the second Wake-up frame 702 to the STA 102 and the STA 101 which have a shorter time period for switching to the Awake state. Since the first Wake-up frame 701 includes the Transition delay of the STA 104, the STA 103 needs to wait for a time period 703 after its conventional RF unit 211 is activated until activation of the conventional RF unit 211 of the STA 104 completes. Finally, after all the STAs 101 to 104 have activated their conventional RF unit 211 and switched to the Awake state, the AP 100 transmits a data frame 704 addressed to all the STAs 101 to 104. The transmission of the data frames can be simultaneous. Compared to FIG. 4, which is a conventional example, time periods for when the conventional RF unit 211 of the STA 101 and the STA 102 is activated (time periods 403 and 404) become unnecessary, and thus the power consumption of the STA 101 and the STA 102 can be reduced.

As described above, in the present embodiment, the AP appropriately control the destinations and the transmission order of Wake-up frames in accordance with Transition delay values of the respective STAs. This makes it possible to reduce the power consumption of the STAs.

Second Embodiment

In the present embodiment, an example will be described in which the AP controls the destinations and the transmission order of Wake-up frames and controls the transmission order of data frames in accordance with Transition delay values of respective STAs. Differences from the first embodiment will be described below.

Figure 8A:
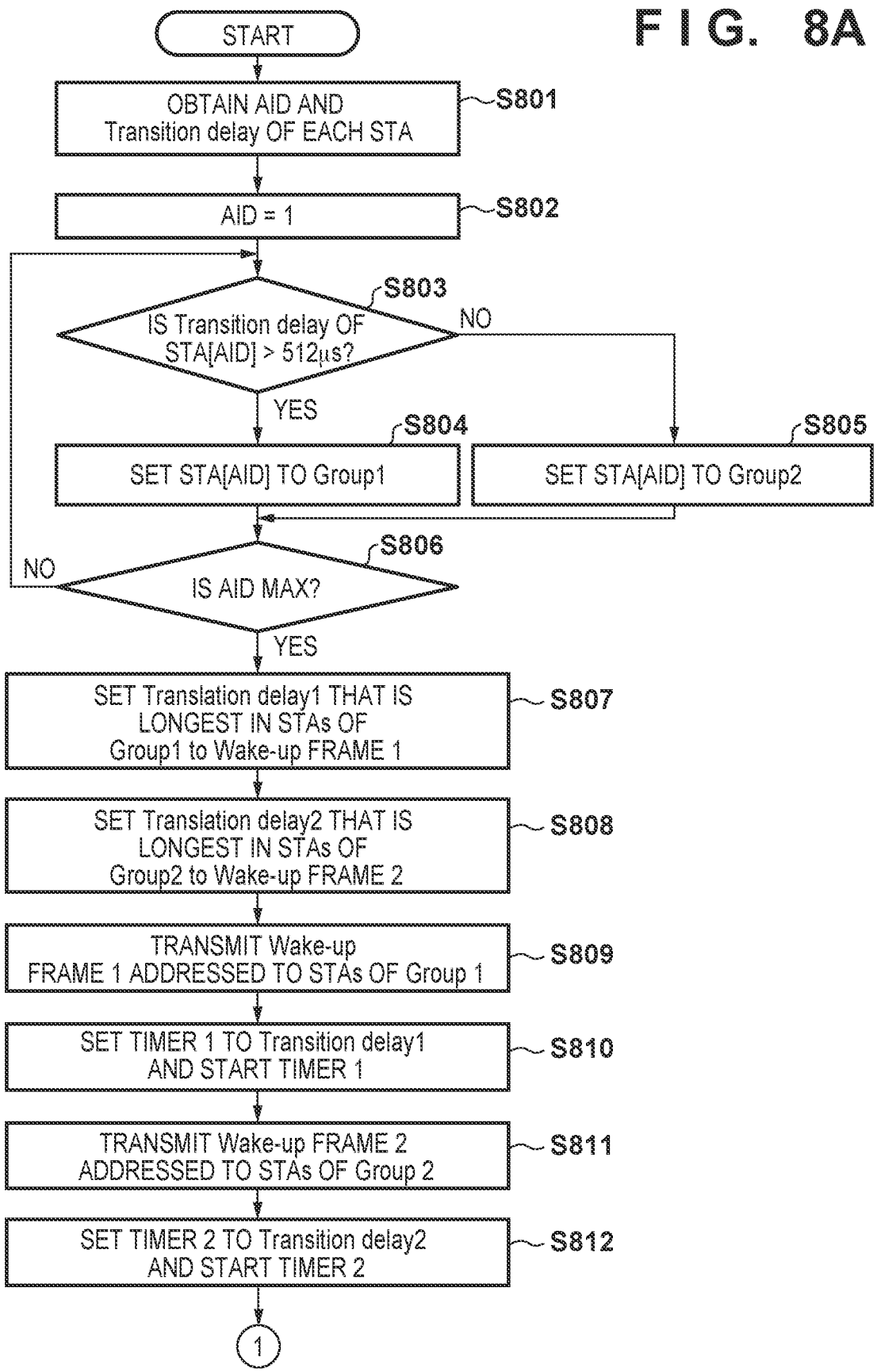
FIGS. 8A and 8B are flowcharts of processing executed by an AP in a second embodiment.
Figure 8B:
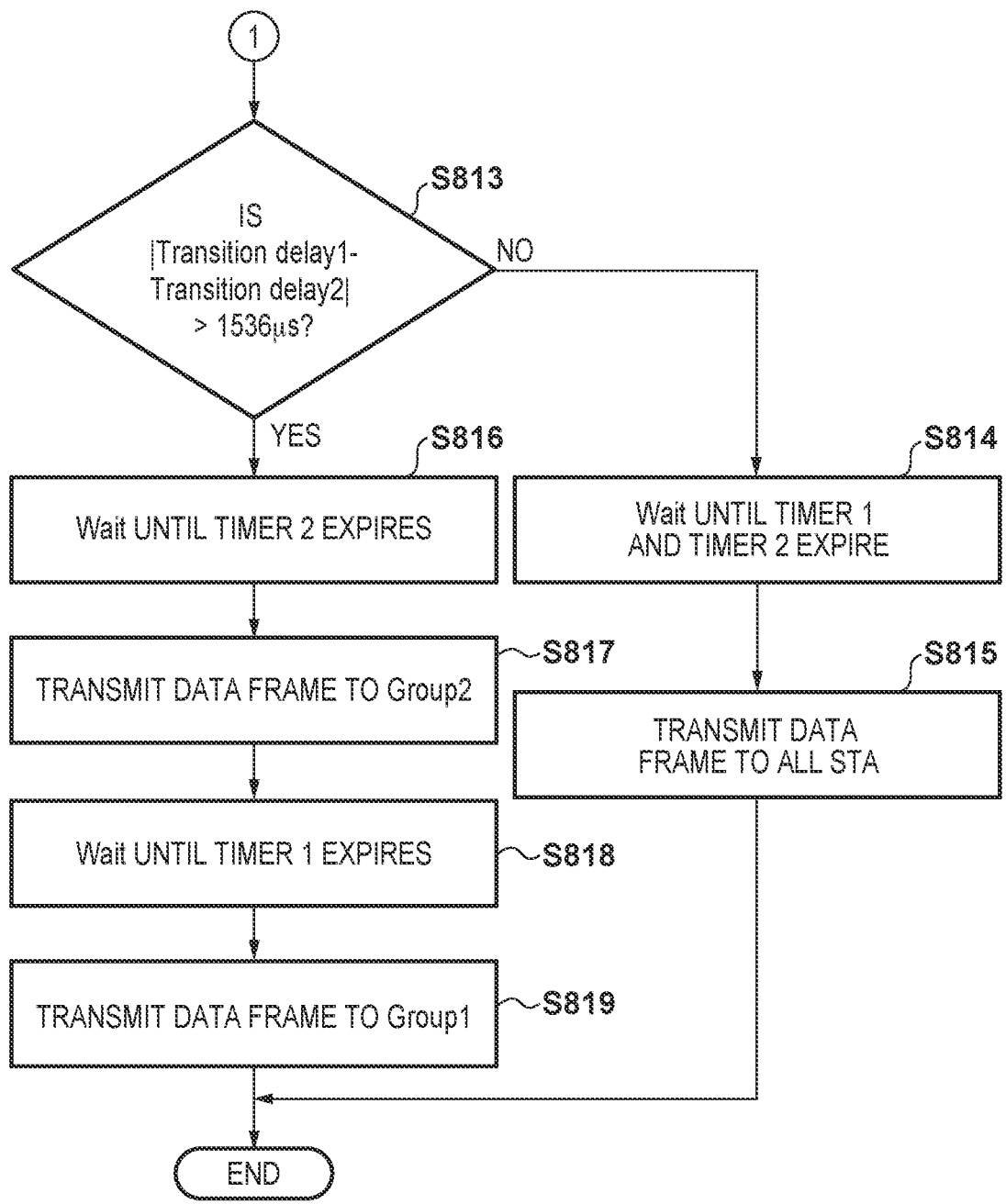

FIGS. 8A and 8B show flowcharts for processing executed by the AP 100 in the present embodiment. The flowcharts shown in FIGS. 8A and 8B can be realized by the control unit 202 of the AP 100 executing a control program stored in the storage unit 201, executing calculation and processing of information, and executing control of respective hardware. The process shown in FIG. 5 can start when the AP 100 holds data addressed to the STAs 101 to 104.

Since the processing up to step S801 to step S812 is similar to the processing up to step S501 to step S512 of FIG. 5 in the first embodiment, the description thereof is omitted. FIG. 9 shows an example of results of grouping by processing for step S804 and step S805 in the present embodiment. According to processing for step S804 and step S805, the STA[1] and the STA[2] (i.e., the STA 101 and the STA 102) which both have Transition delay values of 256 μs are classified as Group2. Also, the STA[3] and the STA[4] (i.e., the STA 103 and the STA 104) which both have Transition delay values of 2048 μs, are classified as Group2. Similarly to the first embodiment, although the number of groups is described as being two in the present embodiment, the number of groups is not limited to two and may be three or more.

In step S813, the Wake-up frame setting unit 303 determines whether or not the difference between Transition delay 1 and Transition delay 2 is larger than a second predetermined value (1536 μs in the case of FIG. 8B). If the difference is greater than the second predetermined value (YES in step S813), the process proceeds to step S816, otherwise (NO in step S813), the process proceeds to step S814. According to the grouping result shown in FIG. 9, since the difference between 256 μs and 2048 μs is larger than 1536 μs, the process proceeds to step S816.

The processing of steps S814 and step S815 are similar to the processing of step S513 and step S514 in FIG. 5, and a description thereof is omitted. In step S816, the Wake-up frame transmission control unit 304 waits until the expiration of the timer 2 for Group2 which has a shorter time period for switching to the Awake state. Next, in step S817, after the expiration of the timer 2 (after the passage of Transition delay 2), the Wake-up frame transmission control unit 304 transmits a data frame addressed to the STAs of Group2. Next, in step S818, the Wake-up frame transmission control unit 304 waits until the expiration of the timer 1 for Group 1 which has a longer time period for switching to the Awake state. Finally, in step S819, after the expiration of the timer 1 (after the passage of Transition delay 1), the Wake-up frame transmission control unit 304 transmits a data frame addressed to the STAs of Group1.

FIG. 10 shows sequences of Wake-up processing according to the present embodiment in accordance with the results of the processing shown in FIG. 5 and the grouping shown in FIG. 6. The AP 100 transmits the first Wake-up frame 1001 addressed to the STA 104 and the STA 103 which have a longer time period for switching to the Awake state, and causes processing for activating the conventional RF unit 211 to start earlier. Next, the AP 100 transmits the second Wake-up frame 1002 addressed to the STA 101 and the STA 102 which have a shorter time period for switching to the Awake state, and causes processing for activating the conventional RF unit 211 to start earlier. The AP 100 then transmits a data frame 1003 addressed to the STA 101 and the STA 102, and finally the AP 100 transmits a data frame 1004 addressed to the STA 103 and the STA 104.

As described above, in the present embodiment, in addition to the process described in the first embodiment, when there are significant differences in Transition delay between the STAs, the AP transmits data frames a plurality of times. This makes it possible to reduce the power consumption of the STAs and at the same time to reduce the delay time for delivery of data frames.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-081314, filed Apr. 22, 2019, which is hereby incorporated by reference herein in its entirety.

What is claimed is:

1. A communication apparatus operable to communicate with a plurality of terminal stations capable of operating in a Doze state in which it is not able to transmit or receive a frame other than a WUR (Wake-up Radio) frame in an IEEE 802.11ba standard and in an Awake state in the standard, the communication apparatus comprising:
   a controller having a processor which executes instructions stored in a memory and/or having a circuitry, the controller causing the communication apparatus to perform operations comprising:
      obtaining, from each of the plurality of terminal stations, a value of a Transition delay indicating a time period required to switch from the Doze state to the Awake state;
      grouping each of the plurality of terminal stations into a plurality of groups based on the value of each of the plurality of terminal stations;
      setting a schedule for transmitting a Wake-up frame for causing a transition from the Doze state to the Awake state for each of the plurality of groups, upon condition that at least two or more groups are managed as the plurality of groups by the communication apparatus; and
      transmitting, according to the set schedule, the Wake-up frame to one or more terminal stations belonging to each of the plurality of groups.

2. A control method of controlling a communication apparatus operable to communicate with a plurality of terminal stations capable of operating in a Doze state in which it is not able to transmit or receive a frame other than a WUR (Wake-up Radio) frame in an IEEE 802.11ba standard and in an Awake state in the standard, the control method comprising:
   obtaining, from each of the plurality of terminal stations, a value of a Transition delay indicating a time period required to switch from the Doze state to the Awake state;
   grouping each of the plurality of terminal stations into a plurality of groups based on the value of each of the plurality of terminal stations;
   setting a schedule for transmitting a Wake-up frame for causing a transition from the Doze state to the Awake state for each group resulting from the grouping, upon condition that at least two or more groups are managed as the plurality of groups by the communication apparatus; and
   transmitting, according to the set schedule, the Wake-up frame to one or more terminal stations belonging to each of the plurality of groups.

3. The control method according to claim 2, wherein in the grouping, the plurality of terminal stations are classified into the plurality of groups so that one or more terminal stations having the value in a predetermined range belong to the same group.

4. The control method according to claim 3, wherein in the setting, a schedule for transmitting the Wake-up frame is set so that a group with a larger largest value in the values of one or more terminal stations belonging to the group has an earlier transmission schedule than other group.

5. The control method according to claim 2, wherein the control method further comprising:
   transmitting data frames to the plurality of terminal stations simultaneously after a predetermined time period has elapsed since the Wake-up frame to one or more terminal stations belonging to a group set as last transmission schedule in the set schedule are transmitted.

6. The control method according to claim 5, wherein the predetermined time period is based on a largest value of the values of one or more terminal stations belonging to each of the plurality of groups.

7. The control method according to claim 5, wherein, when the number of the plurality of groups is two, in the transmitting, the Wake-up frame to one or more terminal stations belonging to a group set as a first group are transmitted, and then the Wake-up frame to one or more terminal stations belonging to a group set as a second group are transmitted, and, after a time period based on a largest value of the values of the one or more terminal stations belonging to the groups set as the first group and the second group has elapsed since the transmission of the Wake-up frame to the one or more terminal stations belonging to the group set as the second group, data frames to the plurality of terminal stations are transmitted simultaneously.

8. The control method according to claim 2, wherein the control method further comprising, if a difference between respective largest values of the values of one or more terminal stations belonging to each of the plurality of groups is larger than a predetermined value, transmitting the Wake-up frame to one or more terminal stations belonging to a group set as last schedule in the set schedule, and then transmits a data frame to one or more terminal stations belonging to one or more groups whose largest values of the value are smaller before transmitting a data frame to the one or more terminal stations belonging to the one or more groups whose largest values of the value are larger.

9. The control method according to claim 8, wherein
   if the number of the plurality of groups is two and the difference between respective largest values of the values of one or more terminal stations belonging to each of the two groups is greater than the predetermined value, 1) a data frame to one or more terminal stations belonging to a group set as a second group in the setting are transmitted, after a predetermined first time period has elapsed from the Wake-up frame to the one or more terminal stations belonging to the group set as the second group are transmitted, and 2) a data frame to one or more terminal stations belonging to a group set as a first group are transmitted, after a predetermined second time period has elapsed from the Wake-up frame to the one or more terminal stations belonging to the group set as the first group are transmitted.

10. The control method according to claim 9, wherein the predetermined first time period is a time period based on a largest value of the values of the one or more terminal stations belonging to the group set as the second group, and the predetermined second time period is a time period based on a largest value of the values of the one or more terminal stations belonging to the group set as the first group.

11. The control method according to claim 2, wherein in the grouping, at least one terminal station including a first terminal station is classified into a first group of the plurality of groups, and at least one terminal station including a second terminal station is classified into a second group of the plurality of groups, and the first terminal station is not classified into the second group.

12. A non-transitory computer-readable storage medium storing a computer program for causing a computer to execute a method of controlling a communication apparatus, wherein the communication apparatus is configured to communicate with a plurality of terminal stations capable of operating in a Doze state in which it is not able to transmit or receive a frame other than a WUR (Wake-up Radio) frame in an IEEE 802.11ba standard and in an Awake state in the standard, the method comprising:

obtaining, from each of the plurality of terminal stations, a value of a Transition delay indicating a time period required to switch from the Doze state to the Awake state;

grouping each of the plurality of terminal stations into a plurality of groups based on the value of each of the plurality of terminal stations;

setting a schedule for transmitting a Wake-up frame for causing a transition from the Doze state to the Awake state for each group resulting from the grouping, upon condition that at least two or more groups are managed as the plurality of groups by the communication apparatus; and transmitting, according to the set schedule, the Wake-up frame to one or more terminal stations belonging to each of the plurality of groups.

13. A control method of controlling a communication apparatus operable to communicate with a plurality of terminal stations capable of operating in a Doze state in which it is not able to transmit or receive a frame other than a WUR (Wake-up Radio) frame in an IEEE 802.11ba standard and in an Awake state in the standard, the control method comprising:

grouping a first terminal station of the plurality of terminal stations into one of a plurality of groups managed by the communication apparatus based on a value of a Transition delay, indicating a time period required to switch from the Doze state to the Awake state, corresponding to the first terminal station; and transmitting multicast frames according to a schedule which is different for each group.

* * * * *